3,666,329
METHOD OF AND MEANS FOR LUBRICATING THE LOWER BEARINGS IN A DRILLING MACHINE
Jean Bell, La Tronche, France, assignor to Societe Generale de Constructions Electriques et Mecaniques (ALSTHOM), Grenoble, France
Filed Jan. 11, 1971, Ser. No. 105,308
Claims priority, application France, Jan. 16, 1970, 7001680
Int. Cl. E21b 9/08
U.S. Cl. 308—8.2
7 Claims

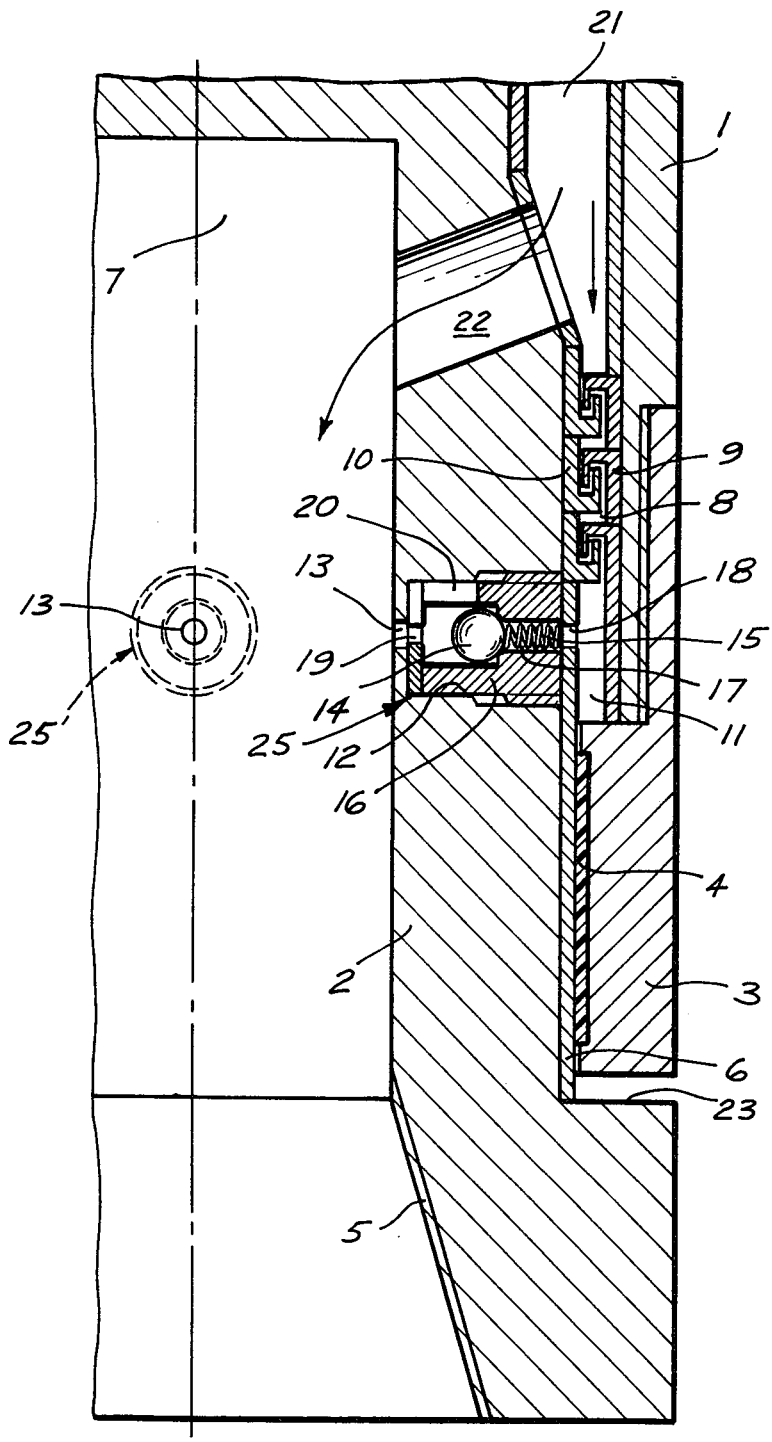

ABSTRACT OF THE DISCLOSURE

Located between the lower drill bearing and a lubricant flow control joint in the lubricant flow passage to such bearing is a calibrated valve constructed to permit flow of lubricant directly from the bore of the turbine shaft to such flow passage when the lubricant pressure at the drilling bit is insufficient to effect adequate lubrication of the lower bearing.

---

This invention relates to underground drilling machines, such as turbo-drills and the like, and more particularly to means for lubricating the lower bearings in such machines.

In drilling machines of the indicated type there is an interaction between the lubricant flow to the tool and the lubricant flow for the lower bearings in such machines, the latter flow being known as leak flow. After the driving fluid (drilling mud) has been turbined by the driving impellers of such a machine, it reaches the lower area of the turbine where it is divided into two streams. The stream containing the greater part of this fluid passes into the bore of the drill shaft and is channeled therethrough to the drilling tool which it lubricates. Subsequently, this part of the fluid is utilized to remove the drilled material as mud flush which flows upwardly in the well exteriorly of the drilling machine. The second stream constituted of the remainder of the driving fluid is channeled down through an annular passage between the drill shaft and the body of the turbine to the lower bearing of the turbine which it lubricates. A flow control joint in the form of a labyrinth is usually fitted in such annular space above the lower bearing to limit or control the flow leak through the bearing.

It will be understood that in the aforesaid arrangement a state of equilibrium should exist in this division in the flow of the driving fluid to the bearing and to the tool, and that it is desirable to obtain the optimum flow rates through the bearing and through the tool. These conditions are not usually attained because on the one hand, the drill bit can only operate satisfactorily if its cutting edge is sufficiently lubricated by not utilizing an excessive leak flow to the lower bearing, while on the other hand, a minimum leak flow is also indispensable for proper lubrication of the lower bearing. Further, since the leak flow rate which determines the pressure loss through the lower bearing, is a function of the pressure loss in the drilling bit, it is evident that the optimum flow pattern can only be established by providing pressure losses through the bit at a given level. Also, the various types of bits that are presently designed for drilling turbines operate at widely differing pressure losses varying from 5 to 50 bars. Thus, the equipment that is now available for use on these drilling machines produce leak flows which are either excessive or insufficient.

It is the primary purpose of the present invention to provide a solution to the aforesaid problem. It has been found that this may be accomplished by automatically adjusting the leak flow to the bearing in relation to the head losses through the bit, through a connection between the bore of the turbine shaft and a portion of the annular bearing lubrication passage located between the bearing and a labyrinth. This connection may comprise one or several radial orifices made in the shaft and each fitted with a calibrated spring loaded valve. A so located suitably loaded valve will block the connection so long as the pressure in the shaft bore upstream of the bit remains sufficient to ensure the leak flow rate that is necessary to lubricate the bearing. When the losses of head in the bit are low and the pressure in the shaft bore is inefficient to ensure a satisfactory rate of leak flow, then the valve will open to allow the passage of mud flush directly from the shaft bore into the said passage portion between the labyrinth and the bearing, thereby furnishing the greater part of the lubricant directly to the bearing without requiring it to pass through the labyrinth. When the connection between the shaft bore and the passage portion is constituted of several orifices, these may be fitted with valves loaded at various pressure levels to ensure a leak flow which corresponds to several levels of back pressure in the bore of the shaft.

For a better understanding of the invention, reference is made to the accompanying drawing which shows by way of example a partial, axial sectional view of the lower end of a drilling turbine embodying the invention.

The turbine drilling machine shown in the drawing is generally of conventional construction and comprises the usual static body or casing 1 enclosing a rotatable hollow drill shaft 2 which is driven by the turbine blades (not shown) in the usual fashion. The turbine, as is customary, is driven by drilling mud which enters into an annular space 21 between the casing 1 and the shaft 2 after passing through the outlet of the turbine blades. The drilling mud passes from the annular space 21 through openings 22 bored in the shaft 2 and into the bore 7 formed in the lower portion of such shaft. The drilling mud then flows downwardly through the shaft bore 7 to the drilling bit (not shown) which is connected to the shaft by screwing it into the thread 5 provided on the lower end of the shaft 2. The mud flush passing from the shaft bore 7 crosses the drilling bit and flows over its cutting edges as is usual. From there the mud flush passes into the well to flow upwardly through the annular space formed between the well wall and the casing 1 and in so doing carries with it the material drilled by the bit.

Screwed to the lower end of the casing 1 is a bearing sleeve 3 having fitted in its bore an elastomer scale or tubular plate 4 preferably made of synthetic material. The plate or seal 4 encloses a rotatable wear ring 6 mounted on the shaft 2. To lubricate these bearing elements 4 and 6, part of the mud flush flowing down through the annular space 21 from the turbine is diverted into a reduced annular extension 8 of such space 21 located below the openings 22. Fitted in the bearing lubricating passage 8, in spaced relation above the bearing 3, is a labyrinth of a type known to the art and composed of a certain number of stages, for example the three stages illustrated, to provide a given control for the volume of mud flush passing to the bearing. Each of the labyrinth stages is constituted of a ring 9 which is L-shaped in cross-section and which is fitted into and forms part of the inner wall of the casing 1, and of a similarly shaped ring 10 mounted on the shaft 2 and interengaged with the ring 9. The rings 9 and 10 are constructed and arranged so that the mud is caused to flow in a complex, restricted path through the labyrinth to establish a given flow rate for the mud. The mud is discharged from the labyrinth into a space 11 between such labyrinth and the bearing 3, and passes from such space 11 between the bearing seal 4 and wear ring 6 to be discharged into the well through the space 23 encircling the drilling turbine.

In the region of the space 11, the aforesaid connection by-passing the labyrinth to feed lubricating mud directly from the shaft bore 7 to the bearing 3 is constructed. As is shown in the drawing this connection is composed of radially aligned orifices 13, 12 and 18 pierced in the shaft 2 and the wear ring 6. The shaft orifice 13 and the wear ring orifice 18 form the reduced entry and discharge ends (respectively), of the passage connecting the shaft bore 7 and space 11 and the body of which is formed by the enlarged orifice or opening 12. The interior wall of the opening 12 is provided with a screwthread and into such opening is screwed a valve seat 16 having a central passage which is in communication with the shaft bore 7 through openings 19 and 13, and with the annular space 11 through the opening 18 in the wear ring 6. The portion 17 of the central passage in the valve seat 16, is blocked off by a valve member 14 which is loaded by a calibrated spring 15, when the pressure in the shaft bore 7 is sufficient to ensure the minimum indispensable flow through the labyrinth for lubricating the bearing. When this pressure is insufficient to ensure a suitable leak flow rate through the labyrinth and consequently to maintain the valve 14 in the closed position against the tension of the spring 15 which has been calibrated to operate when such pressure falls below a given level, such as may occur following the use of a bit with low head losses, the spring 15 will open valve 14. When this occurs the connection will divert or by-pass a supplementary flow of lubricating mud for the bearing 3 from the shaft bore 7 and through the orifices 13 and 19, slots 20, and openings 17 and 18, to the space 11 directly, without requiring such bearing lubricating mud to pass through the labyrinth. In this manner suitable lubrication of bearing 13 is ensured regardless of the pressure losses through the bit. As has been previously explained, additional connections of a similar construction, such as the connection 25' shown in the figure, may be provided, and the springs 15 in such connections may all have the same calibration, or be differently calibrated to take care of different levels of back pressure in the shaft bore 7.

What is claimed is:

1. An underground drilling machine comprising a casing, a shaft having a hollow portion enclosed by said casing, a bearing between said casing and said shaft portion, means supplying lubricating fluid to the bore of said shaft portion and to said bearing, means spaced upwardly from said bearing to control the flow of lubricating fluid from said supplying means to said bearing and forming a chamber between said control means and said bearing, and means providing a connection between the bore of said shaft portion and said chamber and operative to supply lubricating fluid from such shaft bore to said chamber in by-passing relation to said flow controlling means when the pressure of the lubricating fluid in said shaft bore falls below a certain level.

2. An underground drilling machine as defined in claim 1, in which said connection means comprises a passage between the bore of said shaft portion and said chamber, and a calibrated valve contained in said passage.

3. An underground drilling machine as defined in claim 1, in which said flow controlling means is a labyrinth at the upper end of said chamber, in which said bearing comprises a wear ring mounted on said shaft portion and extending into said chamber, and in which said connection comprises a passage between the bore of said shaft portion and said chamber and extending through the shaft wall and said wear ring, and a calibrated valve contained in the portion of said passage formed in the shaft wall.

4. An underground drilling machine as defined in claim 1, in which said connection means comprises a plurality of passages between the bore of said shaft portion and said chamber, and a calibrated valve contained in each of said passages.

5. An underground drilling machine as defined in claim 4, in which all of said valves are calibrated to the same given value.

6. An underground drilling machine as defined in claim 4, in which said valves are calibrated at different values.

7. The method of providing a minimum flow of lubricating fluid to a bearing in a drilling machine, which comprises the steps of dividing a single flow of lubricating fluid under pressure into two streams at a place above the bearing, feeding one of said two streams to a place for supply to the bearing, restricting the flow of said one stream at a place between said place of supply and said place of division, feeding the other of said two streams toward and past said place of supply, and diverting a portion of the other of said two streams to said place of supply, in by-passing relation to said place of restriction, when the pressure of the lubricating fluid is insufficient to provide the minimum flow through said place of restriction.

References Cited

UNITED STATES PATENTS

| 2,880,970 | 4/1959 | Swart | 175—337 |
|---|---|---|---|
| 3,401,758 | 9/1968 | Talbert | 175—337 X |
| 3,303,898 | 2/1967 | Bercaru | 308—8.2 X |
| 2,661,932 | 12/1953 | Woods | 175—337 |
| 2,814,464 | 11/1957 | Pike et al. | 175—337 |

MANUEL A. ANTONAKAS, Primary Examiner

U.S. Cl. X.R.

175—337; 184—7 R